United States Patent [19]

Kishimoto et al.

[11] 4,070,343
[45] Jan. 24, 1978

[54] HEAT STABLE ORGANOPOLYSILOXANE COMPOSITION

[75] Inventors: Keiichi Kishimoto, Ichihara; Yoshinobu Koda, Chiba; Shosaku Sasaki; Masahiko Suzuki, both of Ichihara, all of Japan

[73] Assignee: Toray Silicone Company, Ltd., Ichihara, Japan

[21] Appl. No.: 739,225

[22] Filed: Nov. 5, 1976

Related U.S. Application Data

[63] Continuation-in-part of Ser. No. 616,972, Sept. 26, 1975, abandoned.

[51] Int. Cl.² ............................................. C08K 5/09
[52] U.S. Cl. .................. 260/45.75 F; 260/45.75 R; 260/45.75 P; 260/46.5 R; 260/46.5 G; 260/448.2 S; 252/49.7
[58] Field of Search ............... 260/45.75 R, 45.75 F, 260/45.75 P, 448.2 S, 46.5 G, 46.5 R; 252/49.7

[56] References Cited

U.S. PATENT DOCUMENTS

| | | | |
|---|---|---|---|
| 2,759,904 | 8/1956 | Talcott | 260/45.75 P |
| 3,884,950 | 5/1975 | Koda et al. | 260/45.75 P |

OTHER PUBLICATIONS

Chemistry and Industry – Feb. 16, 1963, pp. 271 to 281.

*Primary Examiner*—V. P. Hoke
*Attorney, Agent, or Firm*—Robert L. McKellar

[57] ABSTRACT

A reaction product of an alkali metal siloxanolate having at least three organosiloxane units per molecule with a cerium salt of an organic carboxylic acid or cerium chloride and an organic carboxylic acid salt or alkoxy compound of zirconium, titanium or iron are added to organosiloxane polymers to improve the heat-stability of the polymer.

7 Claims, No Drawings

4,070,343

HEAT STABLE ORGANOPOLYSILOXANE COMPOSITION

This application is a continuation-in-part of U.S. application Ser. No. 616,972, filed Sept. 26, 1975, now abandoned.

This invention relates to an organopolysiloxane composition exhibiting improved heat stability.

It is well known in the art that the heat stability of organopolysiloxane compositions, particularly fluids and rubbers based on essentially linear diorganosiloxane polymers, can be improved by incorporation therein of certain inorganic salts of iron, zirconium, cerium, manganese, nickel and the like.

The use of compounds of cerium as heat stability additives for such siloxane polymers is shown in Japanese Pat. No. 283,598 and Japanese Pat. No. 535,121, wherein oxides or hydroxides of cerium or aromatic carboxylic acid salts of cerium are incorporated in the siloxane polymer. However, these metal salts are not compatible with the organopolysiloxane, hence, it is necessary to admix the metal salt with a small portion of the siloxane polymer employing a suitable solvent to form a paste which can then be admixed with the siloxane composition. However, even when such additional steps are taken, the dispersion of the metal salt is heterogeneous or insufficient.

It is well known in the art that the heterogeneous or insufficient dispersion of any heat-stability additive through siloxane polymers results in unsatisfactory or minimal improvement in the heat-stability of the polymer. This is particularly noted in liquid organopolysiloxanes having relatively low viscosity because the inorganic or organic salts of cerium form sediments and precipitates when added to liquid organosiloxane polymers and this is especially noted following storage of the liquid. One means proposed for overcoming or minimizing the separation of the cerium compound from the liquid organopolysiloxane is found in U.S. Pat. No. 3,008,901, wherein it is proposed to heat a specific cerium complex salt in a solution of a liquid organopolysiloxane having a minute amount of SiH groups and an aromatic hydrocarbon at 280° to 290° C. with concurrent air-flow through the reaction mixture for one to four days. The proposed reaction is intended to disperse the cerium compound in the form of a colloid in the organopolysiloxane or to dissolve the cerium compound in the organopolysiloxane thereby obtaining a heat-stable organopolysiloxane composition. In the composition prepared in accordance with U.S. Pat. No. 3,008,901, the amount of cerium compound compatible with the organopolysiloxane is very small and because the cerium content is changed by slight changes in the reaction conditions, it is difficult to establish and maintain the cerium content at a predetermined or constant level. Thus, from the commercial or industrial viewpoint, this known technique is unsatisfactory for the continuous preparation of large quantities of heat-stable organopolysiloxane compositions.

It has been found that the reaction product obtained by reaction of a cerium salt of an organic carboxylic acid with an alkali meal siloxanolate or by reaction of cerium chloride with an alkali metal siloxanolate exhibits excellent compatibility with an organopolysiloxane. Novel heat-stable organopolysiloxane compositions are obtained by incorporating such reaction products therein. However, it has been found that after several months storage at room temperature or during use of the organopolysiloxane at elevated temperature, partial sedimentation or precipitation of the cerium compound will reduce the transparency of the organopolysiloxane and the heat-stability as well.

The search for a compatible heat-stability additive system for organopolysiloxanes which remains stable on storage has continued and it is the primary object of this invention to introduce such a system. A further object is to introduce organopolysiloxane rubbers and liquids based on essentially linear diorganosiloxane polymers exhibiting improved heat-stability even after extended periods of storage. Other objects and advantages attained through this invention are disclosed in or will be apparent from the disclosure and claims following.

This invention relates to a mixture of (1) a reaction product of an alkali metal siloxanolate having at least three organosiloxane units per molecular with a cerium salt of an organic carboxylic acid or cerium chloride and (2) a metal compound selected from the group consisting of organic carboxylic acid salts and alkoxy compounds of zirconium, titanium and iron. The foregoing mixture is incorporated into an organopolysiloxane composition to produce a composition exhibiting superior heat-stability. The use of the mixture results in a synergistic effect when compared to the use of either component separately.

The organopolysiloxane composition employed herein is based on an essentially linear diorganosiloxane polymer of the unit formula $R_xSiO_{(4-x/2)}$ when R is an alkyl radical of less than seven carbon atoms, a phenyl radical, a beta-perfluoroalkylethyl radical of three to nine carbon atoms or an alkenyl radical of two to six carbon atoms and $x$ has an average value of 1.98 to 2.01. Preferred as R groups are $CH_3$, $C_2H_5$, $C_3H_7$, $CF_3CH_2CH_2$, $C_6H_5$ and $CH_2=CH$ and minor amounts (e.g., less than 2 percent) of the R groups can be other than those defined above. All R groups can be the same or they can be different. Because of commercial availability, siloxanes wherein at least 50 percent of the R groups are $CH_3$ are preferred. The terminal units on the siloxane polymer can be —OH, $R_3Si$—, RO—, $CH_2=CH$—, and the like. The composition of this invention can be used in a wide variety of fields, hence, the viscosity of the organopolysiloxane employed is not critical and can vary from low polymers (less than 5 cs. viscosity at 25° C.) to high polymer gums (greater than $5 \times 10^6$ cs. viscosity at 25° C.).

The alkali metal siloxanolate containing at least three siloxane units per molecule employed as a reactant herein is known and includes, for example, potassium siloxanolate and sodium siloxanolate. These alkali metal siloxanolates can be produced by known methods such as the synthesis disclosed by W. T. Grubb and R. C. Ostoff in the *Journal of the American Chemical Society*, Vol. 77, page 1405, (1955). A preferred method of preparing the alkali metal siloxanolates comprises preparing a siloxanolate having alkali metal atoms on each of the terminal siloxane units of the molecule and further reacting such alkali metal siloxanolate with an essentially linear diorganopolysiloxane to form an alkali metal siloxanolate having alkali metal substituted siloxane units on only one of the terminal siloxane units in the molecule. Such alkali metal siloxanolates are preferred herein.

As is well known, alkali metal siloxanolates have from 1 to 3 organic groups attached to the Si through silicon-carbon bonds such as hydrocarbon radicals such as methyl, ethyl, vinyl and phenyl and fluorinated hydrocarbon radicals such as trifluoropropyl.

The organic carboxylic acid cerium salt to be used herein for the synthesis of the component (1) of the heat-stability additive of this invention should be soluble in an aromatic hydrocarbon solvent or a chlorinated hydrocarbon solvent. Specific examples of operable cerium salts include cerium-2-ethylhexanoate and cerium naphthenate.

The reaction between the alkali metal siloxanolate and the organic carboxylic acid salt of cerium is generally carried out in an aromatic hydrocarbon solvent or chlorinated hydrocarbon solvent at the reflux temperature of the solvent. When the reaction is completed, any by-produced precipitate can be removed by filtration (or other appropriate means) and the solvent is removed by distillation. The reaction product is generally a liquid.

The reaction between alkali metal siloxanolate and cerium chloride is carried out in an alcohol solvent such as ethanol, isopropanol and butanol, or a mixture of an alcohol with an aromatic hydrocarbon solvent such as benzene and toluene. The reaction can be carried out at room temperature or at elevated temperatures up to the reflux temperature of the solvent. The reaction product may be filtered to remove any by-produced precipitate and the solvent is removed by distillation. The reaction product is a light yellow liquid.

The cerium chloride employed in the above described reaction is subjected to an appropriate dehydrating treatment before the reaction and is employed in the anhydrous state.

The alkali metal siloxanolate employed in the reactions described above to produce the cerium compound (1) employed herein contains at least three siloxane units. It is preferred to employ an alkali metal siloxanolate containin organic substituents and exhibiting a viscosity (determined by the average number of units per molecule) similar to the chemical structure of the organopolysiloxane into which the reaction product is to be incorporated to achieve very high compatibility of the additive with the base siloxane polymer.

The zirconium, titanium or iron salt of an organic carboxylic acid employed as component (2) of the heat-stability additive composition is represented by the general formula

where M is zirconium, titanium or iron, R' is a monovalent hydrocarbon radical preferably containing less than 32 carbon atoms, and $y$ designates the atomic valence of the metal M. Examples of operable organic carboxylic acids include 2-ethylhexanoic acid, naphthenic acid, oleic acid, lauric acid, stearic acid and the like.

The alkoxy compounds of zirconium, titanium or iron employed herein can be represented by the general formula $M(OR'')_y$ where M and $y$ are as above defined and R" is a monovalent hydrocarbon radical as defined for R' above.

The mixture of components (1) and (2) when added to an organopolysiloxane produces better heat stability and storage stability than can be achieved with component (1) above because of the synergistic effect of both components.

The component (1) generally conains 0.5 to 5 percent by weight of cerium but can contain larger or smaller percentages of cerium. Component (1) is the organopolysiloxane composition and is used in an amount such that the cerium content of the total composition is from 0.01 percent to 0.1 percent by weight. When the cerium content of the organopolysiloxane composition is within the stated range, compositions exhibiting much reduced color development can be obtained.

In order to obtain a homogeneous distribution of components (1) and (2) in the organopolysiloxane composition, thus achieving maximum heat stability and storage stability, it is preferred that component (2) should be incorporated in amounts such that the mole ratio of component (2) to cerium present in the composition is in the range from 0.5/1 to 2.0/1.

When a metal compound (2) having a relatively low color-developing property is employed, the organopolysiloxane composition will have a much reduced color development.

The organopolysiloxane composition of this invention may also contain inorganic fillers such as fume silica, silica aerogel, precipitated silica, diatomaceous earth, powdered quartz and similar well-known fillers. Metal soaps, pigments, vulcanizing agents and other standard and well-known additives may be present. For example, a room temperature vulcanizing silicone rubber stock having excellent heat stability can be prepared by incorporating in the organopolysiloxane composition containing the heat-stability additives (1) and (2), an inorganic filler and a combination of a cross-linking agent such as trialkoxy silane, polyalkyl silicate, triacetoxy silane, trioxime silane and methylhydrogensiloxane polymer with a curing catalyst such as metal salts of fatty acids, more particularly, tin salts, or a platinium compound. Thermosetting or heat vulcanizing silicone rubber stocks are obtained by use of organic peroxides or other free radical producers added to the organopolysiloxane composition as is well known in the art.

The compositions of this invention are useful for a wide variety of purposes such as sealants, silicone rubber gaskets, heat stable silicone fluids for hydraulic systems, in automobile brake systems, and in the many known areas wherein silicone fluids and rubbers are presently used.

The following examples illustrate the invention and do not limit the scope of the invention which is set forth in the claims. All parts and percentages in the examples are based on weight and all viscosities are measured at 25° C.

PREPARATION OF SAMPLE I

Employing the method of Grubb and Ostoff (J.A.C.S., Vol. 77, p. 1405 (1955)) potassium siloxanolate was prepared from potassium hydroxide, hexamethylcyclotrisiloxane and octamethylcyclotetrasiloxane. Next, 67 g. of trimethylsilyl endblocked dimethylpolysiloxane having a viscosity of 20 cs. and 3 g. of hexamethylphosphoramide were admixed with 33 g. of the potassium siloxanolate. The reaction mixture was heated at 115° C. under nitrogen gas for 1 hour. Then, 120 g. of dehydrated xylene and 16 g. of cerium 2-ethylhexanoate were added to the reaction mixture and the reaction was carried forward at reflux for 2.5 hours. The reaction mixture was cooled to room temperature and neutralized by addition of 2 g. of trimethylchlorosilane. The precipitate was removed by filtration and the xylene solvent was distilled off and the reaction product obtained was a light yellow clear liquid. The cerium concentration in the reaction product obtained was 1.2 percent. Next, five parts of a naphtha solution of zirconium 2-ethylhexanoate (metal salt concentration, 53 percent) was added to 100 parts of the reaction product and the mixture was stirred to obtain a homogeneous solution.

PREPARATION OF SAMPLE II

A mixture of 60 g. of the potassium siloxanolate prepared in the preparation of Sample I, and 0.5 g. of hexamethylphosphoramide was added to 120 g. of the 20 cs. trimethylsilyl endblocked dimethylpolysiloxane employed above. The mixture was heated at 110° C. for 2 hours under nitrogen. Next, 100 g. of the mixture was dissolved in 150 g. of isopropanol and a solution of 2.5 g. of anhydrous cerium chloride in alcohol (50 g. ethanol and 50 g. isopropanol) was added dropwise to the above solution with concurrent mixing. The resulting reaction mixture was filtered and the solvent removed by vacuum distillation at 40° to 50° C. The remaining filtrate was again filtered to remove trace amounts of precipitate and a light yellow liquid reaction product containing 0.8 percent cerium was obtained. Next, 2.2 parts of tetrabutylzirconate was added to 100 parts of the above reaction product and the mixture was stirred to obtain a homogeneous solution.

PREPARATION OF SAMPLE III

A solution was prepared by adding 70 g. of sodium trimethylsilanolate prepared according to the method disclosed by L. H. Sommer et al., J.A.C.S., Vol. 68, page 2282 (1946), to 25 g. of toluene. Then 100 g. of the 20 cs. dimethylpolysiloxane employed in preparation of Sample I and 6.75 g. of dimethyl formamide were added to the solution. The mixture was heated at 105° to 110° C. for 3 hours and a 2.5 percent solution of 5.25 g. of anhydrous cerium chloride in n-butanol was added dropwise to the reaction mixture with concurrent stirring. The reaction mixture was treated in the same manner as in the case of Sample I and a light yellow liquid reaction product containing a 1.7 percent concentration of cerium was obtained. Then, 4.1 parts of tetrabutyltitanate was added to 100 parts of the reaction product and the mixture was stirred to obtain a homogeneous solution.

PREPARATION OF SAMPLE IV

A mixture was prepared by adding 40 g. of the dimethylpolysiloxane employed in Sample I above and 2.7 g. of dimethyl formamide to a solution of 2.8 g. of the sodium trimethylsilanolate of Sample III in 10 g. of toluene. The mixture was reacted at 105°–110° C. for 3 hours. Then, 65 g. of xylene and 11.5 g. of cerium 2-ethylhexanoate were added to the mixture and further reaction was carried forward at reflux temperature for 3 hours. The reaction mixture was cooled to room temperature and neutralized by adding trimethylchlorosilane. The xylene and dimethyl formamide were removed by vacuum distillation. The precipitate formed was removed by filtration and the liquid reaction product obtained had a cerium concentration of 1.3 percent. Then, 4.7 parts of an iron 2-ethylhexanoate solution in mineral spirits containing 11 percent iron was added to 100 parts of the reaction product. The mixture was stirred to obtain a homogeneous solution.

EXAMPLE 1

1 Kg. of dimethylpolysiloxane having a viscosity of 100 cs. was placed in a 2-liter beaker and 64.3 g. of the Sample I was incorporated in the dimethylpolysiloxane. A homogeneous transparent solution designated Sample I-a was easily obtained.

As a control, 64 g. of the reaction product obtained before the addition of zirconium 2-ethylhexanoate in the preparation of Sample I was added to 1 Kg. of the dimethylpolysiloxane having a viscosity of 100 cs. and a homogeneous transparent solution designated Sample I-b was obtained.

Samples I-a and I-b were placed in a hot air circulating oven maintained at 100° C. The Sample I-b formed a white precipitate after three days in the oven. Sample I-a formed a white precipitate only after 17 days in the oven. This clearly demonstrates the storage and heat stability achieved herein as compared to the closest prior art.

EXAMPLE 2

1 Kg. of dimethylpolysiloxane having a viscosity of 350 cs. was charged to a 2-liter capacity beaker and 96.2 g. of the product obtained in Sample II was incorporated therein to obtain a homogeneous transparent solution (Sample II-a).

Employing the same method employed above, 96 g. of the reaction product obtained before the addition of the tetrabutyl zirconate in the preparation of Sample II was added to 1 Kg. of the 350 cs. dimethylpolysiloxane to obtain a homogeneous transparent solution (Sample II-b).

The Samples II-a and II-b were placed in a hot air circulating oven heated at 100° C. A white precipitate formed in Sample II-b after 10 days in the oven whereas the white precipitate formed in Sample II-a only after 21 days in the oven.

EXAMPLE 3

1 Kg. of a copolymer of 60 mole percent phenylmethylsiloxane units and 40 mole percent dimethylsiloxane units having a viscosity of 350 cs. was charged to a 2-liter beaker and 45.2 g. of the product of Sample III was easily incorporated into the polysiloxane to obtain a homogeneous transparent solution (Sample III-a).

Under the same conditions as above, 45 g. of the reaction product obtained before addition of the tetrabutyltitanate in the preparation of Sample III was added to 1 Kg. of the phenylmethylsiloxane — dimethylsiloxane copolymer employed above to obtain a homogeneous transparent solution (Sample III-b).

The Samples III-a and III-b were placed in a hot air circulating oven heated at 100° C. A white precipitate formed in Sample III-b after 12 days in the oven. In contrast, the Sample III-a remained in the oven for 23 days before a white precipitate was formed.

EXAMPLE 4

1 Kg. of a dimethylpolysiloxane having a viscosity of 100 cs. was charged to a 2-liter beaker. As in the previous examples, 59.3 g. of Sample IV was readily dispersed in the polysiloxane to obtain a homogeneous transparent solution (Sample IV-a).

As a control, 1 Kg. of the 100 cs. dimethylpolysiloxane was charged to a 2-liter beaker and 59 g. of the reaction product obtained before the addition of iron-2-ethylhexanoate in preparing Sample IV was added to the dimethylpolysiloxane to obtain a transparent homogeneous solution (Sample IV-b).

The Samples IV-a and IV-b were placed in a room maintained at 20° to 23° C. and a relative humidity of 50 to 70 percent. A white precipitate formed in Sample IV-b after 67 days. In contrast, a white precipitate formed in Sample IV-a only after 115 days.

EXAMPLE 5

A mixture of 150 g. of 100 cs. dimethylpolysiloxane and 3.3 g. of the reaction product obtained before addition of zirconium 2-ethylhexanoate in preparation of Sample I was charged to a 300 ml. beaker to obtain Sample C.

3.3 g. of Sample I obtained after the addition of zirconium 2-ethylhexanoate was added to 150 g. of the 100 cs. dimethylpolysiloxane to obtain Sample D.

4.8 g. of the reaction product obtained before the addition of tetrabutyl zirconate in preparing Sample II was added to 150 g. of the 100 cs. dimethylpolysiloxane to obtain Sample E.

4.8 g. of Sample II obtained after the addition of tetrabutyl zirconate was added to 150 g. of the 100 cs. dimethylpolysiloxane to obtain Sample F.

2.3 g. of the reaction product obtained before the addition of tetrabutyltitanate in preparing Sample III was added to 150 g. of the 100 cs. dimethylpolysiloxane to obtain Sample G.

2.3 g. of Sample III obtained after the addition of tetrabutyltitanate was added to 150 g. of the 100 cs. dimethylpolysiloxane to obtain Sample H.

3.0 g. of the reaction product obtained before the addition of iron 2-ethylhexanoate in preparing Sample IV was added to 150 g. of the 100 cs. dimethylpolysiloxane to obtain Sample J.

3.0 g. of Sample IV obtained after the addition of iron 2-ethylhexanoate was added to 150 g. of the 100 cs. dimethylpolysiloxane to obtain Sample K.

For comparison, 150 g. of the 100 cs. dimethylpolysiloxane free of any additive was employed as Sample L.

For a further comparison, and to show the synergistic effect of the combination of components (1) and (2) of this invention, there was measured into a 300 ml. capacity beaker, 150 g. of dimethylpolysiloxane having a viscosity of 100 cs. as measured at 25° C., 0.14 g. of mineral spirits solution of iron 2-ethylhexanoate (11 percent iron) and this sample was designated M.

The foregoing 10 samples were heated for 48 hours in a hot air circulating oven maintained at 250° C. and the change in viscosity and the weight loss were recorded. Results obtained are set forth below in the Table. It can readily be seen that the compositions of this invention (Samples D, F, H and K) exhibit better heat resistance than the compositions containing only component (1) or component (2) (Samples C, E, G, M and J).

| Sample | Viscosity (cs. at 25° C.) After 48 Hours Heating | Weight Loss (percent) After 48 Hours Heating |
| --- | --- | --- |
| C | 130 | 6.5 |
| D | 112 | 3.8 |
| E | 120 | 4.8 |
| F | 106 | 2.6 |
| G | 122 | 5.0 |
| H | 108 | 3.3 |
| J | 129 | 6.7 |
| K | 118 | 5.5 |
| L | Gelled after 24 Hrs. heating | 17.0 |
| M | 130 | 7.2 |

Note that a comparison of Sample I in Example 5 with J and M in Example 5 shows the synergistic effect.

That which is claimed is:

1. A composition consisting of an organopolysiloxane composition having incorporated therein as a heat-stability additive a mixture of (1) a reaction product of an alkali metal siloxanolate having an average of at least three siloxane units per molecule with a cerium salt of an organic carboxylic acid or cerium chloride and (2) at least one metal compound selected from the group consisting of organic carboxylic acid salts and alkoxy compounds of zirconium, titanium and iron wherein the mole ratio of component (2) to cerium present in the composition is from 0.5/1 to 2.0/1.

2. The composition of claim 1 wherein the organopolysiloxane composition is a liquid organopolysiloxane.

3. The composition of claim 1 wherein the organopolysiloxane is a room temperature vulcanizing silicone rubber stock or a heat vulcanizing silicone rubber stock.

4. The composition of claim 1 wherein component (1) is present in an amount of 0.5 to 5 percent by weight of the total composition.

5. A composition consisting of an organopolysiloxane composition having incorporated therein as a heat-stability additive a heat stabilizing amount of (1) a reaction product of an alkali metal siloxanolate having an average of at least three siloxane units per molecule with a cerium salt of an organic carboxylic acid or cerium chloride such that there is from 0.01 to 0.1 percent by weight of cerium present in the total composition and (2) at least one metal compound selected from the group consisting of organic carboxylic acid salts and alkoxy compounds of zirconium, titanium and iron wherein component (2) is present in amounts such that the mole ratio of component (2) to cerium in the composition is from 0.5/1 to 2.0/1.

6. A composition consisting essentially of (1) a reaction product of an alkali metal siloxanolate containing an average of at least three siloxane units per molecule with a cerium salt of an organic carboxylic acid or cerium chloride acid (2) at least one metal compound selected from the group consisting of organic carboxylic acid salts and alkoxy compounds of zirconium, titanium, and iron wherein the mole ratio of component (2) to cerium present in the composition is from 0.5/1 to 2.0/1.

7. A composition consisting essentially of (1) a reaction product of an alkali metal siloxanolate containing an average of at least three siloxane units per molecule with a cerium salt of an organic carboxylic acid or cerium chloride such that there is from 0.5 to 5 percent by weight of cerium present in the reaction product and (2) at least one metal compound selected from the group consisting of organic carboxylic acid salts and alkoxy compounds of zirconium, titanium and iron wherein component (2) is present in amounts such that the mole ratio of component (2) to cerium in the composition is from 0.5/1 to 2.0/1.

* * * * *

UNITED STATES PATENT AND TRADEMARK OFFICE
CERTIFICATE OF CORRECTION

PATENT NO. : 4,070,343
DATED : January 24, 1978
INVENTOR(S) : KEIICHI KISHIMOTO ET AL It is certified that error appears in the above-identified patent and that said Letters Patent are hereby corrected as shown below:

Column 1, line 62, "meal" should read --metal--

Column 2, line 18, "molecular" should read -- molecule--

Signed and Sealed this

Eleventh Day of September 1979

[SEAL]

Attest:

Attesting Officer

LUTRELLE F. PARKER
*Acting Commissioner of Patents and Trademarks*